(12) United States Patent
Fuflyigin

(10) Patent No.: US 7,854,149 B2
(45) Date of Patent: Dec. 21, 2010

(54) DIELECTRIC WAVEGUIDE AND METHOD OF MAKING THE SAME

(75) Inventor: Vladimir Fuflyigin, Medford, MA (US)

(73) Assignee: OmniGuide, Inc., Cambridge, MA (US)

( * ) Notice: Subject to any disclaimer, the term of this patent is extended or adjusted under 35 U.S.C. 154(b) by 743 days.

(21) Appl. No.: 11/760,498

(22) Filed: Jun. 8, 2007

(65) Prior Publication Data

US 2008/0141724 A1 Jun. 19, 2008

Related U.S. Application Data

(63) Continuation of application No. 10/720,453, filed on Nov. 24, 2003, now abandoned.

(60) Provisional application No. 60/428,382, filed on Nov. 22, 2002, provisional application No. 60/458,645, filed on Mar. 28, 2003.

(51) Int. Cl.
*C03B 37/018* (2006.01)
(52) U.S. Cl. .................................................. 65/417
(58) Field of Classification Search ............ 65/417–420
See application file for complete search history.

(56) References Cited

U.S. PATENT DOCUMENTS

| 3,485,666 | A | 12/1969 | Sterling et al. |
|---|---|---|---|
| 3,655,438 | A | 4/1972 | Sterling et al. |
| 3,657,006 | A | 4/1972 | Fisher et al. |
| 3,659,915 | A | 5/1972 | Maurer et al. |
| 3,801,355 | A | 4/1974 | Van Cakenberghe |
| 3,823,995 | A | 7/1974 | Carpenter |
| 3,826,560 | A | 7/1974 | Schultz |
| 3,850,604 | A | 11/1974 | Klein |
| 3,886,896 | A | 6/1975 | Van Cakenberghe |
| 3,933,454 | A | 1/1976 | DeLuca |
| 3,938,974 | A | 2/1976 | Macedo et al. |
| 4,063,914 | A | 12/1977 | Roeder et al. |
| 4,117,802 | A | 10/1978 | Le Sergent et al. |
| 4,125,388 | A | 11/1978 | Powers |
| 4,145,458 | A | 3/1979 | Koenings et al. |
| 4,165,223 | A | 8/1979 | Powers |
| 4,212,663 | A | 7/1980 | Aslami |
| 4,217,027 | A | 8/1980 | MacChesney et al. |

(Continued)

FOREIGN PATENT DOCUMENTS

EP  0 060 085 A1  3/1982

(Continued)

OTHER PUBLICATIONS

Blanc, D. and Wilson, J.I.B. "Plasma-enhanced chemical vapor deposition of Ge-Se and Ge-S" Optical Engineering, Oct. 1988, vol. 27, No. 10 p. 917-921.

(Continued)

*Primary Examiner*—Queenie Dehghan
(74) *Attorney, Agent, or Firm*—Fish & Richardson P.C.

(57) ABSTRACT

In general, in one aspect, the invention features a method that includes exposing a surface to a first gas composition under conditions sufficient to deposit a layer of a first chalcogenide glass on the surface, and exposing the layer of the first chalcogenide glass to a second gas composition under conditions sufficient to deposit a layer of a second glass on the layer of the first chalcogenide glass, wherein the second glass is different from the first chalcogenide glass.

14 Claims, 6 Drawing Sheets

U.S. PATENT DOCUMENTS

| | | |
|---|---|---|
| 4,217,123 A | 8/1980 | Titchmarsh |
| 4,324,803 A | 4/1982 | Bergmann et al. |
| 4,334,903 A | 6/1982 | MacChesney et al. |
| 4,339,173 A | 7/1982 | Aggarwal et al. |
| 4,349,373 A | 9/1982 | Sterling et al. |
| 4,405,655 A | 9/1983 | Tuin |
| 4,410,345 A | 10/1983 | Usui et al. |
| 4,473,596 A | 9/1984 | Beerwald et al. |
| 4,612,294 A | 9/1986 | Katsuyama et al. |
| 4,714,589 A | 12/1987 | Auwerda et al. |
| 4,728,350 A | 3/1988 | Cocito |
| 4,730,896 A | 3/1988 | Katsuyama et al. |
| 4,733,940 A | 3/1988 | Broer et al. |
| 4,747,861 A | 5/1988 | Schneider et al. |
| 4,877,938 A | 10/1989 | Rau et al. |
| 4,908,053 A | 3/1990 | Nishii et al. |
| 4,909,816 A | 3/1990 | MacChesney et al. |
| 4,913,518 A | 4/1990 | Fine |
| 4,932,752 A | 6/1990 | Krashkevich et al. |
| 5,015,844 A | 5/1991 | Cole |
| 5,026,409 A | 6/1991 | Robinson et al. |
| 5,069,701 A | 12/1991 | Pastor et al. |
| 5,185,021 A | 2/1993 | Miura et al. |
| 5,211,731 A | 5/1993 | Busse et al. |
| 5,344,792 A | 9/1994 | Sandhu et al. |
| 5,360,637 A | 11/1994 | Jacoboni et al. |
| 5,454,847 A | 10/1995 | Jacoboni et al. |
| 5,483,614 A | 1/1996 | Bruck et al. |
| 5,518,516 A | 5/1996 | Garnham |
| 5,609,660 A | 3/1997 | Francis et al. |
| 5,629,953 A | 5/1997 | Bishop et al. |
| 5,641,956 A | 6/1997 | Vengsarkar et al. |
| 5,661,839 A | 8/1997 | Whitehead |
| 5,729,646 A | 3/1998 | Miyagi et al. |
| 5,740,287 A | 4/1998 | Scalora et al. |
| 5,802,236 A | 9/1998 | DiGiovanni et al. |
| 5,812,729 A | 9/1998 | Allison et al. |
| 5,814,367 A | 9/1998 | Hubbard et al. |
| H1754 H | 10/1998 | Tran et al. |
| 5,879,426 A | 3/1999 | Sanghera et al. |
| 5,917,108 A | 6/1999 | Itoh et al. |
| 5,949,935 A | 9/1999 | Schaafsma et al. |
| 5,953,478 A | 9/1999 | Sanghera et al. |
| 5,958,103 A | 9/1999 | Yoneda et al. |
| 5,991,486 A | 11/1999 | Braglia |
| 6,058,127 A | 5/2000 | Joannopoulos et al. |
| 6,074,968 A | 6/2000 | Yoneda et al. |
| 6,075,915 A | 6/2000 | Koops et al. |
| 6,108,474 A | 8/2000 | Eggleton et al. |
| 6,115,526 A | 9/2000 | Morse |
| 6,128,429 A | 10/2000 | Cole et al. |
| 6,130,780 A | 10/2000 | Joannopoulos et al. |
| 6,175,671 B1 | 1/2001 | Roberts |
| 6,195,483 B1 | 2/2001 | Moon et al. |
| 6,201,916 B1 | 3/2001 | Eggleton et al. |
| 6,260,388 B1 | 7/2001 | Borrelli et al. |
| 6,301,421 B1 | 10/2001 | Wickham et al. |
| 6,334,017 B1 | 12/2001 | West |
| 6,334,019 B1 | 12/2001 | Birks et al. |
| 6,380,551 B2 | 4/2002 | Abe et al. |
| 6,389,197 B1 | 5/2002 | Iltchenko et al. |
| 6,404,966 B1 | 6/2002 | Kawanishi et al. |
| 6,413,891 B1 | 7/2002 | Cho et al. |
| 6,463,200 B2 | 10/2002 | Fink et al. |
| 6,504,645 B1 | 1/2003 | Lenz et al. |
| 6,542,690 B1* | 4/2003 | Ellison et al. ............. 385/141 |
| 6,563,981 B2 | 5/2003 | Weisberg et al. |
| 6,603,911 B2 | 8/2003 | Fink et al. |
| 6,625,364 B2 | 9/2003 | Johnson et al. |
| 6,728,439 B2 | 4/2004 | Weisberg et al. |
| 6,788,864 B2 | 9/2004 | Ahmad et al. |
| 6,801,698 B2 | 10/2004 | King et al. |
| 6,816,243 B2 | 11/2004 | Shurgalin et al. |
| 6,831,934 B2 | 12/2004 | Wang et al. |
| 6,844,070 B2* | 1/2005 | Johnson et al. ............. 428/408 |
| 6,879,386 B2 | 4/2005 | Shurgalin et al. |
| 6,895,154 B2 | 5/2005 | Johnson et al. |
| 6,898,359 B2 | 5/2005 | Soljacic et al. |
| 6,903,873 B1 | 6/2005 | Joannopoulos et al. |
| 2001/0026667 A1 | 10/2001 | Kawanishi et al. |
| 2002/0039046 A1 | 4/2002 | Lipson et al. |
| 2003/0031852 A1 | 2/2003 | Fink et al. |
| 2003/0044158 A1 | 3/2003 | King et al. |
| 2003/0044159 A1 | 3/2003 | Anderson et al. |
| 2003/0049003 A1* | 3/2003 | Ahmad et al. ............... 385/123 |
| 2004/0013379 A1 | 1/2004 | Johnson et al. |
| 2004/0137168 A1 | 7/2004 | Fuflyigin |
| 2004/0141702 A1 | 7/2004 | Fuflyigin et al. |
| 2004/0223715 A1 | 11/2004 | Benoit et al. |
| 2005/0226579 A1 | 10/2005 | Fink et al. |
| 2005/0259933 A1 | 11/2005 | Temelkuran et al. |
| 2005/0259934 A1 | 11/2005 | Temelkuran et al. |
| 2005/0259942 A1 | 11/2005 | Temelkuran et al. |
| 2005/0259944 A1 | 11/2005 | Anderson et al. |
| 2005/0271340 A1 | 12/2005 | Weisberg et al. |

FOREIGN PATENT DOCUMENTS

| | | |
|---|---|---|
| EP | 0 195 630 | 9/1986 |
| EP | 0 426 203 | 5/1991 |
| EP | 0955273 | 11/1999 |
| GB | 2288469 | 10/1995 |
| JP | 2000-035521 | 2/2000 |
| JP | 2001-051244 | 2/2001 |
| WO | WO 94/09393 | 4/1994 |
| WO | WO 94/16345 | 7/1994 |
| WO | WO 97/01774 | 1/1997 |
| WO | WO 00/22466 | 4/2000 |
| WO | WO 00/46287 | 8/2000 |
| WO | WO 02061467 | 8/2002 |
| WO | WO 02084345 | 10/2002 |

OTHER PUBLICATIONS

Voronin, N.I. et al. "Chalcogenide-glass optical fibers for the infrared range produced by plasma-chemical deposition from the gas phase" Sov. Phys. Dokl. 30(4), Apr. 1985, p. 306-307.

Mizrahi, Amit and Schachter "Bragg reflection waveguides with a matching layer" Optics Express Jul. 12, 2004 vol. 12, No. 14.

Varshneya, Arun. *Fundamentals of Inorganic Glasses*. San Diego, CA, Academic Press, Inc., 1994. pp. 5-7.

A. Asseh, et al., "10cm $Yb^{3+}$ DFB fibre laser with permanent phase shifted grating", Electron. Lett., 31 (12): 969 (1995).

A. S. Oliveira et al., "Frequency upconversion in $Er^{3+}/Yb^{3+}$-codoped chalcogenide glass," Appl. Phys. Lett, 72 (7): 753-755 (1998).

A.T. Clausen et al., "10-GHz return-to-zero pulse source tunable in wavelength with the single- or multiwavelength output based on four-wave mixing in a newly developed highly nonlinear fiber," IEEE Photon. Technol. Lett., 13 (1): 70-72 (2001).

Andrea Melloni et al., "All-optical switching in phase-shifted fiber Bragg grating," IEEE Photonics Technology Letters, 12 (1): 42-44, Jan. 2000.

B.E. Little et al., "Microring resonator arrays for VLSI photonics", IEEE Photon. Technol. Lett., 12 (3): 323-325 (2000).

Berger V. "From photonic band gaps to refractive index engineering." Optical Materials, 11:2-3, Jan. 1999, pp. 131-142.

B. J. Eggleton et al., "All-optical switching in long-period fiber gratings," Optics Letters, 22 (12): 883-885, Jun. 15, 1997.

B. J. Eggleton et al., "Grating resonance in air-silica microstructured optical fibers", Opt. Lett., 24 (21): 1460 (1999).

B. Malo, et al., "Photosensitivity in phosphorous-doped silica glass and optical waveguides," Appl. Phys. Lett 65 (4): 394 (1994).

Chang et al. "Vector Normal Modes on Two-Core Optical Fibers—Part I: The Normalmode solutions." Journal of Lightwave Technology, 15:7, Jul. 1997, pp. 1213-1223.

D. Furniss et al., "A novel approach for drawing optical fibers from disparate core/clad. glasses," J Non-Cryst. Sol. 213-214: 141-146 (1997).

E. Anderson et al., "Dielectric Materials for Manufacturing Photonic Bandgap Waveguide," US Patent Disclosure, (2001).

E. Brinkmeyer, et al., "Fibre Bragg reflector for mode selection and line-narrowing of injection lasers", Electron. Lett., 22 (3): 134 (1986).

Feigel A. et al. "Chalcogenide glass-based three-dimensional photonic crystals." Applied Physics Letters, 77:20, pp. 3221-3223, Nov. 13, 2000.

Fink et al. "Guiding optical Light in Air Using an All-Dielectric Structure;" Journal of Lightwave Technology, vol. 17, No. 11, Nov. 1999.

G. Meltz, et al., "Formation of Bragg gratings in optical fibers by a transverse holographic method", Opt.Lett., 14 (15): 823 (1989).

G. S. He et al., "Efficient amplification of a broad-band optical signal through stimulated Kerr scattering in a CS2 liquid-core fiber system," IEEE J. Quantum Electron., 28 (1): 323-329 (1992).

H.A. Haus, et al., "Antisymmetric taper of distributed feedback lasers", IEEE J. Quantum Electron., QE-12 (9): 532 (1976).

I. Gannot, et al., "Current Status of Fexible Waveguides for IR Laser Radiation Transmission", IEEE J. Sel. Topics in Quantum Electr., IEEE Service Center, 2 (4): 880-888 (Dec. 1996).

J. Fick et al., "High photoluminescence in erbium-doped chalcogenide thin films," J. Non-cyrstalline Solids, 272 (2-3): 200-208 (2000).

J. Kobelke et al., "Chalcogenide glass single mode fibers—preparation and properties," J. Non-Cyrstalline Solids, 256-7: 226-231 (1999).

J. M. Harbold et al., "Highly nonlinear As-S-Se glasses for all-optical switching," Optics Lett., 27 (2): 119-121 (2002).

J. Marchionda et al., "Advanced rod in tube techniques for fluoride fiber fabrication," Ceramics Transactions, Solid-State Optical Materials, eds. Allan J. Bruce and B.V. Hiremath, 28: 587-596 (1992).

Johnson et al., "Low-loss asymptotically single-mode propagation in large-core OmniGuide fibers," Optics Express, vol. 9, No. 13, pp. 748-779, Dec. 17, 2001.

J. S. Foresi et al., "Photonic-bandgap microcavities in optical waveguides," Nature, 390: 143-145 (Nov. 13, 1997).

Jia Jiang et al., "Fluorophosphate cladding glasses for fluoride glass fibers," J Non-Cryst. Sol., 213 and 214: 11-15 (1997).

J-X Cai, et al., "Simultaneous tunable dispersion compensation of many WDM channels using a sampled nonlinearly chirped fiber Bragg grating", IEEE Photon. Tech. Lett., 11 (11): 1455 (1999).

K. O. Hill, et al., "Photosensitivity in optical fiber waveguides: Application to reflection filter fabrication", Appl. Phys. Lett., 32 (10): 647 (1978).

K. O. Hill, et al., "Efficient mode conversion in telecommunication fibre using externally written gratings", Electron. Lett., 26 (16): 1270 (1990).

L. F. Stokes, et al., "All-single-mode fiber resonator", Opt. Lett., 7 (6): 288 (1982).

Louis Poirier et al., "Nonlinear coaxial photonic crystal," Applied Physics Letters, 78 (18): 2626-2628, Apr. 30, 2001.

Massadegh R. et al. "Fabrication of single-mode chalcogenide optial fiber." Journal of Lightwave Technology, 16:2, pp. 214-216, Feb. 1998.

M. Ibanescu et al., "An all dielectric coaxial waveguide," Science, 289: 415-419 (2000).

M. Miyagi, et al., "Fabrication of germanium-coated nickel hollow waveguides for infrared transmission", Appl. Phys. Lett., 43 (5): 430 (1983).

Monro, T.M. et al. "Chalcogenide Holey Fibres." Electronics Letters, 36:24, pp. 1998-2000, Nov. 23, 2000.

M. Skorobogatiy et al., *Optics Express*, 10, p. 1227 (2002).

M.W. Moore et al., "Sputtering of Chalcogenide Coatings on to Fluoride Glass," Novel Glasses and Processes, pp. 193-197.

N. Croitoru, et al., "Characterization of hollow fibers for the transmission of infrared radiation", Appl. Opt., 29 (12): 1805 (1990).

Nishii, J. et al. "Chalcogenide glass fiber with a core-cladding structure." Applied Optics, 28: 23, pp. 5122-5127, Dec. 1, 1989.

Piere R. Villeneuve et al., "Single-mode waveguide microcavity for fast optical switching," Opt. Lett., 21 (24): 2017-2019, Dec. 15, 1996.

P. Yeh et al., *J. Opt. Soc. Am.*, 68, p. 1196 (1978).

R. E. Smith et al., "Reduced coupling loss using a tapered-rib adiabatic-following fiber coupler," IEEE Photon. Technol. Lett., 8 (8): 1052-1054 (1996).

R.F. Cregan et al., *Science 285*, p. 1537-1539, (1999).

R. Nubling and J. Harrington "Hollow-waveguide delivery systems for high-power, industrial $CO_2$ lasers," *Applied Optics*, 34, No. 3, pp. 372-380 (1996).

R. U. Ahmad et al., "Ultracompact corner-mirror and T-branches in silicon-on-insulator," IEEE Photon. Technol. Lett., 14 (1): 65-76 (Jan. 2002).

Sanghera, J.S. et al. "Development and infrared applications of chalcogenide class optial fibers." Fiber and Integrated Optics, 19:3, pp. 251-274, Mar. 1, 2000.

Sanghera, J.S. et al. "Fabrication of long lengths of low-loss IR transmitting AS40S (60-X) sex glass fibers." Journal of Lightwave Technology, 14:5, pp. 743-748, May 1, 1996.

S. Coen et al., "White-light supercontinuum generation with 60-ps pump pulses in a photonic crystal fiber," Opt. Lett., 26 (17): 1356-1358 (2001).

S. Ramachandran and S. G. Bishop, "Low loss photoinduced waveguides in rapid thermally annealed films of chalcogenide glasses," Appl. Phys. Lett., 74 (1): 13-15 (1999).

Stojan Radic et al., "Theory of low-threshold optical switching in nonlinear phase-shifted periodic structures," J.Opt.Soc.Am. B, 12 (4): 671-680, Apr. 1995.

T. Cardinal et al., "Non-linear optical properties of chalcogenide glasses in the system As-S-Se," J. Non-Cyrstalline Solids, 256-7: 353-360 (1999).

T.A. Birks et al., "Dispersion Compensation Using Single-Material Fibers," IEEE Photonics Technology Letters, 11 (6): 674-676 (1999).

Y. Fink et al., "Block copolymers as photonic band gap materials," J. Lightwave Tech., 17 (11): 1963-1969, (JLT IEEE-special issue on photonic crystals-invited paper) (1999).

Y. Matsuura, et al., "Hollow glass waveguides with three layered dielectric coating fabricated by chemical vapor deposition," J. Opt. Soc. Amer., 14 (6): 1255 (1997).

Y. Matsuura, et al., "Optical properties of small-bore hollow glass waveguides", J. Opt. Soc. Amer., 34 (30): 6842-6847 (1995).

Y. Yamamoto et al., Phys. Today, 46: 66-73 (1993).

Yoel Fink et al., "A dielectric omnidirectional reflector," Science, 282: 1679-1682 (1998).

Yong Xu et al., "Asymptotic Analysis of Bragg Fiber," Optics Letters, 25 (24): 1756-1758 (2000).

* cited by examiner

DIELECTRIC WAVEGUIDE AND METHOD
OF MAKING THE SAME

CROSS-REFERENCE TO RELATED APPLICATIONS

This application is a continuation of U.S. patent application Ser. No. 10/720,453, entitled "DIELECTRIC WAVEGUIDE AND METHOD OF MAKING THE SAME," filed Nov. 24, 2003, which claims priority to Provisional Patent Application 60/428,382, entitled "HIGH POWER WAVEGUIDE," and filed Nov. 22, 2002, and Provisional Patent Application 60/458,645, entitled "PHOTONIC CRYSTAL FIBER," and filed Mar. 28, 2003, the entire contents each of which are hereby incorporated by reference.

BACKGROUND

This invention relates to the field of dielectric waveguides and methods for making waveguides.

Waveguides play important roles in numerous industries. For example, optical waveguides are widely used in telecommunications networks, where fiber waveguides such as optical fibers are used to carry information between different locations as optical signals. Such waveguides substantially confine the optical signals to propagation along a preferred path or paths. Other applications of optical waveguides include imaging applications, such as in an endoscope, and in optical detection.

The most prevalent type of fiber waveguide is an optical fiber, which utilizes index guiding to confine an optical signal to a preferred path. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode for a given wavevector parallel to the waveguide axis. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts ranging from about 0.2% to 3% for wavelengths in the range of 1.5 μm, depending on the application.

Drawing a fiber from a preform is the most commonly used method for making fiber waveguides. A preform is a short rod (e.g., 10 to 20 inches long) having the precise form and composition of the desired fiber. The diameter of the preform, however, is much larger than the fiber diameter (e.g., 100's to 1000's of times larger). Typically, when drawing an optical fiber, the material composition of a preform includes a single glass having varying levels of one or more dopants provided in the preform core to increase the core's refractive index relative to the cladding refractive index. This ensures that the material forming the core and cladding are rheologically and chemically similar to be drawn, while still providing sufficient index contrast to support guided modes in the core. To form the fiber from the preform a furnace heats the preform to a temperature at which the glass viscosity is sufficiently low (e.g., less than $10^8$ Poise) to draw fiber from the preform. Upon drawing, the preform necks down to a fiber that has the same cross-sectional composition and structure as the preform. The diameter of the fiber is determined by the specific rheological properties of the fiber and the rate at which it is drawn.

Preforms can be made using many techniques known to those skilled in the art, including modified chemical vapor deposition (MCVD), outside vapor deposition (OVD), plasma activated chemical vapor deposition (PCVD) and vapor axial deposition (VAD). Each process typically involves depositing layers of vaporized raw materials onto a wall of a pre-made tube or rod in the form of soot. Each soot layer is fused shortly after deposition. This results in a preform tube that is subsequently collapsed into a solid rod, over jacketed, and then drawn into fiber.

Optical fibers applications can be limited by wavelength and signal power. Preferably, fibers should be formed from materials that have low absorption of energy at guided wavelengths and should have minimal defects. Where absorption is high, it can reduce signal strength to levels indistinguishable from noise for transmission over long fibers. Even for relatively low absorption materials, absorption by the core and/or cladding heats the fiber. Defects can scatter guided radiation out of the core, which can also lead to heating of the fiber. Above a certain power density, this heating can irreparably damage the fiber. Accordingly, many applications that utilize high power radiation sources use apparatus other than optical fibers to guide the radiation from the source to its destination.

SUMMARY

High power laser systems are disclosed. Such systems operate at powers of at least about one Watt. In some cases, operational intensity can be more than about 100 Watts, such as about a kilowatt or more. These systems include dielectric waveguides for delivering the laser beam to a target. The energy guided by the waveguides can have extremely high power densities. For example, the power density in some waveguides can be more than about $10^6$ W/cm$^2$ (e.g., more than about $10^8$ W/cm$^2$, more than about $10^{10}$ W/cm$^2$).

Suitable dielectric waveguides include fiber waveguides capable of guiding high power electromagnetic energy, such as certain photonic crystal fibers (e.g., certain Bragg fibers). Such dielectric waveguides include one or more portions formed from a chalcogenide glass. In some embodiments, the dielectric waveguides can include two (or more) different chalcogenide glasses, where the different chalcogenide glasses have different refractive indexes. Note that the refractive index of a material refers to the refractive index of a material at the wavelength at which the waveguide is designed to guide light. Preferably, the different glasses have similar thermomechanical properties and can be co-drawn.

The portions of the waveguide are structural elements of the waveguide that determine the optical properties of the waveguide (e.g., structural elements that determine how the waveguide confines an optical signal to a path). In preferred embodiments, the fiber waveguide is a photonic crystal fiber, which includes a core and a confinement region. The confinement region has a refractive index variation that forms a bandgap and reflects light within a certain range of frequencies, confining that light to the core. One type of photonic crystal fiber is a Bragg fiber, in which the confinement region can include multiple layers of different composition that give rise to the index variation. In such cases, each of the layers is considered a portion of the waveguide.

Photonic crystal waveguides can have hollow cores, which is advantageous in high power applications because absorption of guided energy by the core (and subsequent heating) is significantly reduced compared to a solid core waveguide.

In some embodiments, the dielectric waveguides are configured to guide electromagnetic energy at infrared wavelengths (e.g., between about 1 micron and 15 microns, between about 5 microns and 12 microns, such as about 10.6 microns). The materials forming the waveguides (e.g., chalcogenide glasses) may have relatively low absorption at these wavelengths compared to other materials, such as some other glasses. Thus, use of chalcogenide glasses at these wavelengths can be advantageous because they may have lower loss than similar waveguides formed from other materials (e.g., polymers or oxide glasses), making them suitable for guiding output energy from the high power laser to the target.

Methods for making dielectric waveguides are also disclosed. In particular, chemical vapor deposition (CVD) methods suitable for depositing layers of different materials in a deposition tube are disclosed. These methods can be used, for example, to deposit alternating layers of two different chalcogenide glasses in a deposition tube or to deposit alternating layers of a chalcogenide glass and an oxide glass. CVD methods can provide preforms that can be drawn into fibers with low defect densities. Because defects tend to scatter energy, which locally heats the fiber, low defect density fiber is particularly desirable for high power density transmission where excessive heating can be fatal to the fiber.

In general, in a first aspect, the invention features a waveguide that includes a first portion extending along a waveguide axis including a first chalcogenide glass, and a second portion extending along the waveguide axis including a second chalcogenide glass, wherein the second chalcogenide glass is different from the first chalcogenide glass.

Embodiments of the waveguide can include one or more of the following features and/or features of other aspects.

The first chalcogenide glass can have a different refractive index than the second chalcogenide glass. The first chalcogenide glass can include As and Se. For example, the first chalcogenide glass can include $As_2Se_3$. In some embodiments, the first chalcogenide glass can further include Pb, Sb, Bi, I, or Te. The second chalcogenide glass can include As and S (e.g., $As_2S_3$), and/or P and S. The second chalcogenide glass can include Ge or As.

The first chalcogenide glass can have a refractive index of 2.7 or more. The second chalcogenide glass has a refractive index of 2.7 or less. The first chalcogenide glass can have a glass transition temperature ($T_g$) of about 180° C. or more. The second chalcogenide glass can have a $T_g$ of about 180° C. or more.

The waveguide can have a loss coefficient less than about 2 dB/m for electromagnetic energy having a wavelength of about 10.6 microns. The waveguide can have a hollow core. The first portion can surround a core (e.g., the hollow core). The second portion can also surround the core. The second portion can surround the first portion. The core can have a minimum cross-sectional dimension of at least about $10\lambda$ (e.g., about $20\lambda$, $50\lambda$, $100\lambda$), where $\lambda$ is the wavelength of radiation guided by the waveguide. The core can have a minimum cross-sectional dimension of at least about 50 microns (e.g., at least about 100 microns, at least about 200 microns).

The waveguide can be a photonic crystal fiber, such as a Bragg fiber. The photonic crystal fiber can include a confinement region and the first and second portions are part of the confinement region.

In general, in another aspect, the invention features a method that includes providing a waveguide having a first portion extending along a waveguide axis including a first chalcogenide glass and a second portion extending along the waveguide axis, and guiding electromagnetic energy from a first location to a second location through the waveguide.

Embodiments of the method can include one or more of the following features, and/or features of other aspects.

The second portion can include a second chalcogenide glass different from the first chalcogenide glass. The electromagnetic energy can have a wavelength of between about 2 microns and 15 microns. The electromagnetic energy can have an intensity of more than about one Watt (e.g., more than about 5 Watts, 10 Watts, 50 Watts, 100 Watts, such as 1 kW or more).

The method can include coupling the electromagnetic energy from a laser into the waveguide. The laser can be a $CO_2$ laser.

The waveguide can be a photonic crystal fiber, such as a Bragg fiber.

In general, in a further aspect, the invention features an apparatus that includes a dielectric waveguide extending along an axis and configured to guide electromagnetic radiation along the axis, wherein the electromagnetic radiation has a power greater than about 1 Watt.

Embodiments of the apparatus can include one or more of the following features and/or features of other aspects.

The electromagnetic radiation can have a wavelength greater than about 2 microns (e.g., greater than about 5 microns). The electromagnetic radiation can have a wavelength less than about 20 microns (e.g., less than about 15 microns). For example, the electromagnetic radiation can have a wavelength between about 10 microns to 11 microns (e.g., about 10.6 microns).

The electromagnetic radiation can have a power greater than about 5 Watts (e.g., greater than about 10 Watts, 50 Watts, 100 Watts, such as 1 kW or more).

The dielectric waveguide can include a first portion extending along the waveguide axis including a first chalcogenide glass. The dielectric waveguide can further include a second portion extending along the waveguide axis, the second portion having a different composition than the first portion. The second portion can include an oxide glass or a chalcogenide glass. For example, the second portion can include a second glass different from the first chalcogenide glass.

The waveguide can be a photonic crystal fiber, such as a Bragg fiber. The waveguide can have a hollow core.

In general, in another aspect, the invention features a method that includes exposing a surface to a first gas composition under conditions sufficient to deposit a layer of a first chalcogenide glass on the surface, and exposing the layer of the first chalcogenide glass to a second gas composition under conditions sufficient to deposit a layer of a second glass on the layer of the first chalcogenide glass, wherein the second glass is different from the first chalcogenide glass.

Embodiments of the method can include one or more of the following features and/or features of other aspects.

Exposing the surface to the first gas composition can include activating a plasma in the first gas composition. Activating the plasma can include exposing the gas to electromagnetic radiation to activate the plasma (e.g., microwave or radio frequency radiation).

Exposing the layer of the first chalcogenide glass to the second gas composition can include activating a plasma in the second gas composition, which can include exposing the second gas composition to electromagnetic radiation to activate the plasma (e.g., microwave or radio frequency radiation).

The second gas composition is typically different from the first gas composition. The first gas composition can include one or more halide compounds (e.g., one or more chloride compounds). The first gas composition can include a carrier gas (e.g., nitrogen or a noble gas, like argon). The first gas composition can include a chalcogen. The first gas composition pressure can be between about 2 and 20 Torr.

The second gas composition can include one or more halide compounds (e.g., chloride compounds). The second gas composition can include a carrier gas (e.g., nitrogen or a noble gas, like argon). The second gas composition can include a chalcogen. Alternatively, or additionally, the second gas composition comprises oxygen. The second gas composition pressure can be between about 2 and 20 Torr.

The second glass can be an oxide glass or a chalcogenide glass.

The surface can be a surface of a tube, e.g., an inner surface of a tube. The tube can be a glass (e.g., an oxide glass, such as a silicate glass) tube or a polymer tube. In some embodiments, the surface is a planar surface.

In general, in a further aspect, the invention features a method that includes introducing a first gas composition into a tube, the first gas composition including a first compound that is substantially inert with respect to a first material forming the inner surface of the tube, and exposing the first gas composition to conditions sufficient to change the first compound into a second compound reactive with the first material and to deposit a layer of a second material on the inner surface of the tube.

Embodiments of the method can include one or more of the following features and/or features of other aspects.

Exposing the first gas composition to conditions sufficient to change the first compound into a second compound can include activating a plasma in the first gas composition. In some embodiments, activating the plasma includes exposing the first gas composition to electromagnetic radiation (e.g., microwave or radio frequency radiation).

The first compound can include oxygen. For example, the first compound can be nitrous oxide. The second compound can be oxygen. The first material can be a glass, such as a chalcogenide glass.

In some embodiments, the method further includes exposing the layer of the first material to a second gas composition under conditions sufficient to deposit a layer of a second material on the layer of the first material, wherein the second glass is different from the first glass. For example, the first glass can be a chalcogenide glass and the second glass can be an oxide glass.

Embodiments of the invention may include one or more of the following advantages.

Waveguides disclosed herein can guide high intensity electromagnetic radiation without sustaining damage due to heating. These waveguides can exhibit low loss at guided wavelengths.

The CVD techniques disclosed herein may be used to deposit layers of dissimilar materials (e.g., optically dissimilar) on a substrate. In some embodiments, dissimilar materials can be deposited without significant undesirable reactions occurring between the gases used for depositing a second material and the surface of the initially deposited material. In some embodiments, the CVD process can deposit layers of optically dissimilar materials that have similar thermomechanical properties, and can be co-drawn. Waveguides formed using the CVD process can have low defect densities (e.g., low impurity concentrations), and may thus be particularly suitable for high power applications, where high defect densities could result in significant heating (and ultimately, failure) of the waveguide.

Unless otherwise defined, all technical and scientific terms used herein have the same meaning as commonly understood by one of ordinary skill in the art to which this invention belongs. In case of conflict, the present specification, including definitions, will control. In addition, the materials, methods, and examples disclosed herein are illustrative only and not intended to be limiting.

Additional features, objects, and advantages of the invention will be apparent from the following detailed description and drawings, and from the claims.

DESCRIPTION OF DRAWINGS

Like reference symbols in the various drawings indicate like elements.

DETAILED DESCRIPTION

Figure 1:
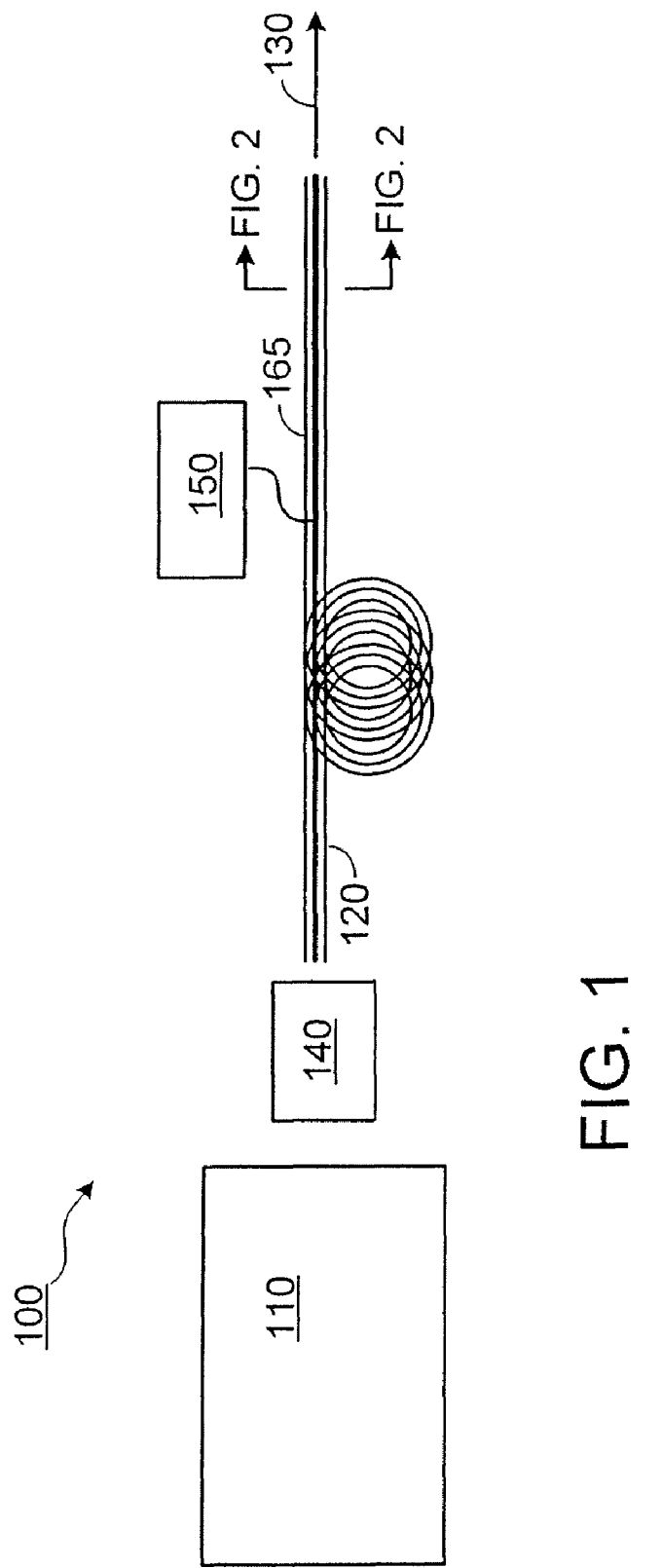
FIG. 1 is a schematic diagram of a laser system incorporating a photonic crystal fiber.

Referring to FIG. 1, a laser system 100 includes a laser 110 and a photonic crystal fiber 120 for guiding electromagnetic (EM) energy from the laser to a location 130 remote from the laser. Radiation is coupled from laser 110 into fiber 120 using a coupler 140. Laser 110 can be continuous wave or pulsed. The distance between laser 110 and location 130 can vary depending on the specific application, and can be on the order of several meters or more (e.g., more than about 10 m, 20 m, 50 m, 100 m).

Laser system 100 can operate at UV, visible, or infrared (IR) wavelengths. In some embodiments, photonic crystal fiber 120 is configured to guide IR energy emitted by laser 110, and the energy has a wavelength between about 0.7 microns and 20 microns (e.g., between about 2 to 5 microns or between about 8 to 12 microns). In some embodiments, laser 110 is a $CO_2$ laser and the radiation has a wavelength of about 6.5 microns or 10.6 microns. Other examples of lasers which can emit IR energy include Nd:YAG lasers (e.g., at 1.064 microns) Er:YAG lasers (e.g., at 2.94 microns), Er, Cr:YSGG (Erbium, Chromium doped Yttrium Scandium Gallium Garnet) lasers (e.g., at 2.796 microns), Ho:YAG lasers (e.g., at 2.1 microns), free electron lasers (e.g., in the 6 to 7 micron range), and quantum cascade lasers (e.g., in the 3 to 5 micron range.

The power emitted from laser 110 at the guided wavelength can vary. Although the laser power can be relatively low, e.g., mW, in many applications the laser system is operated at high powers. For example, the laser output intensity can be more than about one Watt (e.g., more than five Watts, 10 Watts, 20 Watts). In some applications, the laser output energy can be more than about 100 Watts, such as several hundred Watts (e.g., about 200 Watts, 300 Watts, 500 Watts, 1 kilowatt).

For high power systems, the power density guided by fiber 120 can be extremely high. For example, power density in the fiber can be more than about $10^6$ W/cm$^2$, such as more than about $10^7$ W/cm$^2$, $10^8$ W/cm$^2$, $10^9$ W/cm$^2$, or $10^{10}$ W/cm$^2$.

Fiber 120 can have relatively low losses at the guided wavelength (e.g., less than about 10 dB/m, 5 dB/m, 2 dB/m, 1 dB/m, 0.5 dB/m, 0.2 dB/m). Due to the low loss, only a relatively small amount of the guided energy is absorbed by the fiber, allowing the fiber to guide high power radiation without substantial damage due to heating.

Coupler 140 can be any coupler suitable for the wavelength and intensity at which the laser system operates. One type of a coupler is described by R. Nubling and J. Harrington in "Hollow-waveguide delivery systems for high-power, industrial CO$_2$ lasers," *Applied Optics*, 34, No. 3, pp. 372-380 (1996). Other examples of couplers include one or more focusing elements, such as one or more lenses. Coupling efficiency can be high. For example, coupler 140 can couple more than about 70% of the laser output into a guided mode in the fiber (e.g., more than about 80%, 90%, 95%, 98%). Coupling efficiency refers to the ratio of power guided away by the desired mode to the total power incident on the fiber.

Optionally, system 100 includes a cooling apparatus 150 (e.g., a pump or compressor), which reduces heating of fiber 120 during operation. Cooling apparatus 150 can be an air-based system, forcing air through a sheath 165, which surrounds other portions of the fiber. Alternatively, cooling apparatus 150 can utilize a liquid coolant (e.g., water), forcing a liquid through the sheath. Cooling apparatus 150 may be particularly beneficial in applications where the fiber guides energy at extremely high intensities (e.g., several hundred Watts or kilowatts). For example, the fiber may be maintained at temperatures within its operational range at such high intensities.

Figure 2:
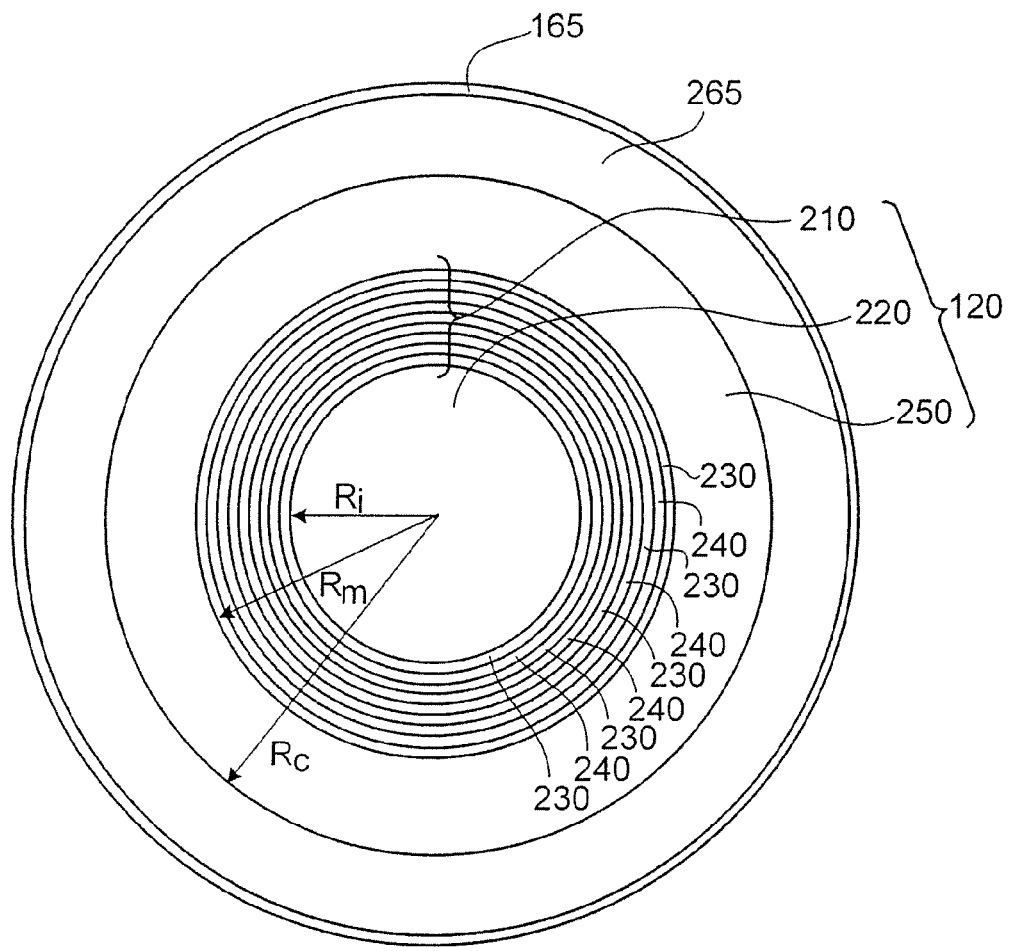
FIG. 2 is a cross-sectional view of an embodiment of a photonic crystal fiber.

Referring to FIG. 2, photonic crystal fiber 120 includes a core 220 extending along a waveguide axis and a dielectric confinement region 210 (e.g., a multilayer cladding) surrounding the core. Confinement region 210 is surrounded by a support layer 250, which provides mechanical support for the confinement region. Optionally, support layer 250 is surrounded by sheath 165. A space 265 exists between sheath 165 and fiber 120. As discussed previously, a liquid or gas can be forced through the space between the sheath and the cladding to cool the fiber during operation.

In the embodiment of FIG. 2, confinement region 210 is shown to include alternating layers 230 and 240 of dielectric materials having different refractive indices. One set of layers, e.g., layers 240, define a high-index set of layers having an index $n_H$ and a thickness $d_H$, and the other set of layers, e.g., layers 230, define a low-index set of layers having an index $n_L$ and a thickness $d_L$, where $n_H > n_L$ (e.g., $n_H - n_L$ can be greater than or equal to or greater than 0.01, 0.05, 0.1, 0.2, 0.5 or more). For convenience, only a few of the dielectric confinement layers are shown in FIG. 1. In practice, confinement region 210 may include many more layers (e.g., more than about 15 layers, 20 layers, 30 layers, 40 layers, 50 layers, such as 80 or more layers).

Although not illustrated in FIG. 2, fiber 120 may include one or more additional layers between the confinement region and the core. For example, the fiber may include one or more layers selected to tailor the dispersion characteristics of the fiber. Examples of such fibers are described in U.S. patent application Ser. No. 10/057,440, entitled "PHOTONIC CRYSTAL OPTICAL WAVEGUIDES HAVING TAILORED DISPERSION PROFILES," filed Jan. 25, 2002, and having Pub. No. US-2002-0176676-A1, the entire contents of which are hereby incorporated by reference.

Layers 240 include a material having a high refractive index, such as a chalcogenide glass. The high index material in layers 240 can be rheologically compatible with the material forming layers 230. The material in each of layers 240 can be the same or different. Layers 230 include a material having a refractive index lower than the high index material of adjacent layers 240, and can include a second chalcogenide glass or an oxide glass. In embodiments where layers 230 and 240 both include chalcogenide glasses, the glasses are usually different. The material in each of layers 230 can be the same or different. Examples of high and low index materials are described below.

In the present embodiment, core 220 is hollow. Optionally, the hollow core can be filled with a fluid, such as a gas (e.g., air, nitrogen, and/or a noble gas) or liquid (e.g., an isotropic liquid or a liquid crystal). Alternatively, core 220 can include any material or combination of materials that are Theologically compatible with the materials forming confinement region 210. In certain embodiments, core 220 can include one or more dopant materials, such as those described in U.S. patent application Ser. No. 10/121,452, entitled "HIGH INDEX-CONTRAST FIBER WAVEGUIDES AND APPLICATIONS," filed Apr. 12, 2002 and now published under Pub. No. US-2003-0044158-A1, the entire contents of which are hereby incorporated by reference.

Photonic crystal fiber 120 has a circular cross-section, with core 220 having a circular cross-section and region 210 (and layers therein) having an annular cross-section. In other embodiments, however, the waveguide and its constituent regions may have different geometric cross-section such as a rectangular or a hexagonal cross-section. Furthermore, as mentioned below, core and confinement regions 220 and 210 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 220 and 210, however, is defined by a change in index. The change may be caused by the interface of two different dielectric materials or by different dopant concentrations in the same dielectric material (e.g., different dopant concentrations in silica).

Dielectric confinement region 210 guides EM radiation in a first range of wavelengths to propagate in dielectric core 220 along the waveguide axis. The confinement mechanism is based on a photonic crystal structure in region 210 that forms a bandgap including the first range of wavelengths. Because the confinement mechanism is not index-guiding, it is not necessary for the core to have a higher index than that of the portion of the confinement region immediately adjacent the core. To the contrary, core 220 may have a lower average index than that of confinement region 210. For example, core 220 may be air, some other gas, such as nitrogen, or substantially evacuated. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 220 may include a porous dielectric material to provide some structural support for the surrounding confinement region while still defining a core that is largely air. Accordingly, core 220 need not have a uniform index profile.

The alternating layers 230 and 240 of confinement region 210 form what is known as a Bragg fiber. The alternating layers are analogous to the alternating layers of a planar dielectric stack reflector (which is also known as a Bragg mirror). The annular layers of confinement region 210 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures, such as those described above). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 210 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index-contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega = c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in U.S. Pat. No. 6,463,200, entitled "OMNIDIRECTIONAL MULTILAYER DEVICE FOR ENHANCED OPTICAL WAVEGUIDING," to Yoel Fink et al., the contents of which are incorporated herein by reference.

When alternating layers 230 and 240 in confinement region 210 give rise to an omnidirectional bandgap with respect to core 220, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflection in a planar geometry of at least 95% for all angles of incidence ranging from 0° to 80° and for all polarizations of EM radiation having frequency in the omnidirectional bandgap. Furthermore, even when photonic crystal fiber 120 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index-contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al., *Science* 285, p. 1537-1539, 1999. Furthermore, even in a Bragg-like configuration, the high-index layers may vary in index and thickness, and/or the low-index layers may vary in index and thickness. The confinement region may also include a periodic structure including more than two layers per period (e.g., three or more layers per period). Moreover, the refractive index modulation may vary continuously or discontinuously as a function of fiber radius within the confinement region. In general, the confinement region may be based on any index modulation that creates a photonic bandgap.

In the present embodiment, multilayer structure 210 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness $\lambda/4$, or equivalently $d_H/d_L = n_L/n_H$, where d and n refer to the thickness and index, respectively, of the high-index and low-index layers. These correspond to layers 240 and 230, respectively. Normal incidence corresponds to $\beta = 0$. For a cylindrical waveguide, the desired modes typically lie near the light line $\omega = c\beta$ (in the large core radius limit, the lowest-order modes are essentially plane waves propagating along z-axis, i.e., the waveguide axis). In this case, the quarter-wave condition becomes:

$$\frac{d_H}{d_L} = \frac{\sqrt{n_L^2 - 1}}{\sqrt{n_H^2 - 1}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

Some embodiments of photonic crystal fibers are described in U.S. patent application Ser. No. 10/057,258, entitled "LOW-LOSS PHOTONIC CRYSTAL FIBER HAVING LARGE CORE RADIUS," to Steven G. Johnson et al., filed Jan. 25, 2002 and published under Pub. No. US-2002-0164137-A1, the entire contents of which are hereby incorporated by reference.

The radius of core 220 can vary depending on the end-use application of fiber 120. The core radius can depend on the wavelength or wavelength range of the energy to be guided by the fiber, and on whether the fiber is a single or multimode fiber. For example, where the fiber is a single mode fiber for guiding visible wavelengths (e.g., between about 400 nm and 800 nm) the core radius can be in the sub-micron to several micron range (e.g., from about 0.5 µm to 5 µm). However, where the fiber is a multimode fiber for guiding IR wavelengths (e.g., from about 2 µm to 15 µm, such as 10.6 µm), the core radius can be in the tens to thousands of microns range (e.g., from about 10 µm to 2,000 µm, such as 500 µm to 1,000 µm). The core radius can be greater than about $5\lambda$ (e.g., more than about $10\lambda$, $20\lambda$, $50\lambda$, $100\lambda$), where $\lambda$ is the wavelength of the guided energy.

Two mechanisms by which energy can be lost from a guided signal in a photonic crystal fiber are by absorption loss and radiation loss. Absorption loss refers to loss due to material absorption. Radiation loss refers to energy that leaks from the fiber due to imperfect confinement. Both modes of loss can be studied theoretically, for example, using transfer matrix methods and perturbation theory. A discussion of transfer matrix methods can be found in an article by P. Yeh et al., *J. Opt. Soc. Am.*, 68, p. 1196 (1978). A discussion of perturbation theory can found in an article by M. Skorobogatiy et al., *Optics Express*, 10, p. 1227 (2002). Particularly, transfer matrix code finds propagation constants $\beta$ for the "leaky" modes resonant in a photonic crystal fiber structure. Imaginary parts of $\beta$'s define the modal radiation loss, thus $LOSS_{radiation} \sim Im(\beta)$. Loss due to material absorption is calculated using perturbation theory expansions, and in terms of the modal field overlap integral it can be determined from $$Loss_{absorption} \sim 2\pi\omega \int_0^\infty r\,dr(\alpha \vec{E}_\beta^* \vec{E}_\beta),$$

where $\omega$ is the radiation frequency, r is the fiber radius, $\alpha$ is bulk absorption of the material, and $\vec{E}_\beta$ is an electric field vector.

Based on theoretical and/or empirical investigations, photonic crystal fibers, such as fiber 120, can be designed to minimize one or both mode of loss. Guided modes can be classified as one of three types: pure transverse electric (TE); pure transverse magnetic (TM); and mixed modes. Loss often depends on the type of mode. For example, TE modes can exhibit lower radiation and absorption losses than TM/mixed modes. Accordingly, the fiber can be optimized for guiding a mode that experiences low radiation and/or absorption loss. Alternatively, or additionally, the fiber can be optimized for a mode that is well matched to the mode of laser 110. For example, the fiber can be optimized for guiding the $HE_{11}$ (mixed) mode, which is well matched to the $TEM_{00}$ mode of a laser. Being "well matched" refers to efficient coupling between the mode of the laser and the guided mode of the fiber.

Radiation loss can be reduced by adding layers to the confinement region of fiber 120, increasing the index contrast between the high and low index layers, increasing the core radius and/or lowering the intrinsic absorption losses of the first few layers by selecting materials with low absorption at the guided wavelengths. For example, at wavelengths of about 3 microns, chalcogenide glasses exhibit an absorption coefficient of about 4 dB/m compared to many polymers which have an absorption coefficient of about $10^5$ dB/m in that wavelength range. Similarly, at 10.6 microns, chalcogenide glasses have an absorption coefficient of about 10 dB/m compared to $10^5$ dB/m for many polymers. Thus, using chalcogenide glasses instead of polymers can reduce losses in some cases. However, polymers, like oxide glasses, can provide lower index materials than chalcogenide glasses.

As an example, consider a photonic crystal fiber having a core radius $R_i$=500 µm, the confinement region materials have indices of $n_l$=2.3 and $n_h$=2.7, with a bi-layer thickness, d=2.3 µm. The corresponding thickness of the low index and high index layers are 1.3 µm and 1.0 µm, respectively. For the purposes of this example, the intrinsic bulk absorption loss of high/low index materials is taken to be 10 dB/m. The support layer ($R_c$=1500 µm) is assumed to have absorption loss of $10^5$ dB/m, typical of polymers. The confinement region has 55 layers, thus $R_m$=563 µm.

Figure 3A:
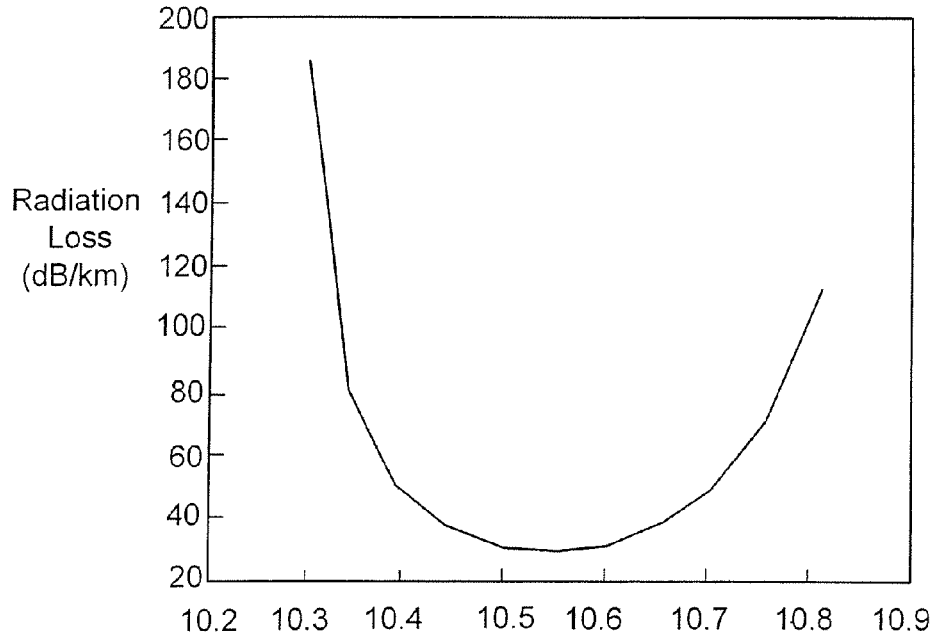
FIG. 3A is a plot showing modeled radiation loss of a photonic crystal fiber as a function of wavelength.
Figure 3B:
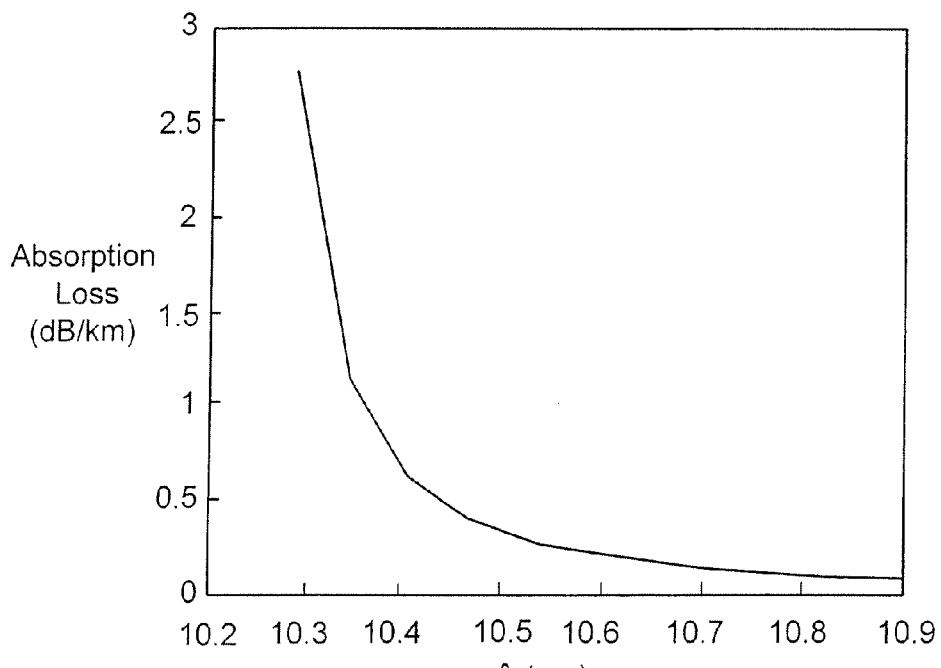
FIG. 3B is a plot showing modeled absorption loss of the photonic crystal fiber as a function of wavelength.

At $\lambda$=10.6 µm, a theoretical model indicates that these structural parameters define a fiber radiation loss of 24 dB/km (with a radiation loss decreasing by about an order of magnitude with every 30 layers added to the confinement region), and a material absorption loss in the confinement region of 0.23 dB/km. Adding 60 more layers to the confinement region reduces radiation loss, which then becomes comparable to the material absorption loss in the mirror. These results are summarized in FIG. 3A and FIG. 3B, which respectively show the dependence of the radiation and absorption losses on the operating wavelength.

In contrast, consider a fiber having a similar structure, except where the low index and high index materials have refractive indices of $n_l$=1.5 and $n_h$=2.8, with a bi-layer thickness of d=2.82 µm (the bi-layer refers to a high index and low index layer pair). These refractive index values are representative of a polymer low index material and a chalcogenide glass high index material. The corresponding layer thicknesses are 1.97 µm and 0.84 µm for the low and high index layers, respectively. The intrinsic bulk absorption loss of high index material is 10 dB/m. The support layer ($R_c$=1500 µm) and low index material are assumed to have absorption loss of $10^5$ dB/m, typical of polymers. In this example, the confinement region is assumed to have 35 layers (17.5 bi-layers), thus $R_m$=549 µm.

At $\lambda$=10.6 µm, these structural parameters define a fiber radiation loss of 1.09 dB/km (with a radiation loss decreasing by an order of magnitude with every 4 bi-layers added), and a material absorption loss, in the mirror, of 320 dB/km, where power dissipation loss will be dominated by material absorption in the first few polymer layers of the confinement region.

Accordingly, in some embodiments, the low index material can be selected to have low absorption loss in the first few layers of the confinement region, and higher relative absorption loss in outer layers. The index contrast can be higher in the outer layers compared the inner layers. For example, the confinement region can have low index layers that include a chalcogenide glass in layers close to the core, but include a polymer or oxide glass in layers further from the core. The high index layers can include a chalcogenide glass throughout.

As discussed previously, materials can be selected for the confinement region to provide advantageous optical properties (e.g., low absorption with appropriate indices of refraction at the guided wavelength(s)). However, the materials should also be compatible with the processes used to manufacture the fiber. In some embodiments, the high and low index materials (e.g., the first and second chalcogenide glasses) should preferably be compatible for co-drawing. Criteria for co-drawing compatibility are provided in aforementioned U.S. patent application Ser. No. 10/121,452, entitled "HIGH INDEX-CONTRAST FIBER WAVEGUIDES AND APPLICATIONS." In addition, the high and low index materials should preferably be sufficiently stable with respect to crystallization, phase separation, chemical attack and unwanted reactions for the conditions (e.g., environmental conditions such as temperature, humidity, and ambient gas environment) under which the fiber is formed, deployed, and used.

As mentioned in the foregoing description of fiber 120, layers 240 and 230 can include a first and second chalcogenide glass, respectively (e.g., glasses containing a chalcogen element, such as sulphur, selenium, and/or tellurium). In addition to a chalcogen element, chalcogenide glasses may include one or more of the following elements: boron, aluminum, silicon, phosphorus, sulfur, gallium, germanium, arsenic, indium, tin, antimony, thallium, lead, bismuth, cadmium, lanthanum and the halides (fluorine, chlorine, bromide, iodine).

Chalcogenide glasses can be binary or ternary glasses, e.g., As—S, As—Se, Ge—S, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—S—Tl, As—Se—Tl, As—Te—Tl, As—Se—Ga, Ga—La—S, Ge—Sb—Se or complex, multi-component glasses based on these elements such as As—Ga—Ge—S, Pb—Ga—Ge—S, etc. The ratio of each element in a chalcogenide glass can be varied.

The amount of the first chalcogenide glass in the high index material can vary. Typically, the high index material includes at least about 50% by weight of the first chalcogenide glass (e.g., at least 70%, 80%, 90%, 95%, 98%, 99%). The high index material can be substantially exclusively chalcogenide glass (i.e., about 100% chalcogenide glass). In some embodiments, in addition to the first chalcogenide glasses, the high index material can include one or more additional chalcogenide glasses, heavy metal oxide glasses, amorphous alloys, or combinations thereof.

In some embodiments, the high index material is a chalcogenide glass including As and Se. For example, the high index material can include $As_2Se_3$. $As_2Se_3$ has a glass transition temperature ($T_g$) of about 180° C. and a thermal expansion coefficient (TEC) of about $24 \times 10^{-6}$/° C. At 10.6 μm, $As_2Se_3$ has a refractive index of 2.7775, as measured by Hartouni and coworkers and described in *Proc. SPIE,* 505, 11 (1984), and an absorption coefficient, α, of 5.8 dB/m, as measured by Voigt and Linke and described in "Physics and Applications of Non-Crystalline Semiconductors in Optoelectronics," Ed. A. Andriesh and M. Bertolotti, NATO ASI Series, 3. High Technology, Vol. 36, p. 155 (1996). Both of these references are hereby incorporated by reference in their entirety.

The first chalcogenide glass can include $As_2Se_3$ and one or more other elements. Examples of other elements that can be included are In, Sn, Sb, Te, I, Tl, Pb, and/or Bi. The index of the first chalcogenide glass can be greater than the refractive index of $As_2Se_3$. For example, chalcogenide glasses including Sb and/or Te in addition to $As_2Se_3$ can increase the refractive index of the chalcogenide glass above the refractive index of $As_2Se_3$. The refractive index of the first chalcogenide glass in these embodiments can be greater than about 2.8 (e.g., more than 2.9, such as about 3.0 or more).

Some elements that can be added to $As_2Se_3$ to increase the refractive index of the first chalcogenide glass can change the thermomechanical properties of the first chalcogenide glass from the thermomechanical properties of $As_2Se_3$. The thermomechanical properties include phase transition temperatures, such as $T_g$, and other parameters such as the glass's TEC. For example, iodine may increase the refractive index of the first chalcogenide glass, but can reduce $T_g$. In such cases, one or more additional compounds may be added to the first chalcogenide glass to mitigate the effects of the index-raising element on the glasses thermomechanical properties. On example of an element that can reduce such thermomechanical effects is Ge. In embodiments, the second chalcogenide glass can have a $T_g$ of more than about 180° C. (e.g., about 200° C., 220° C., 250° C. or more).

The amount of additional compounds added to $As_2Se_3$ in the first chalcogenide glass can vary. Typically, the amount of various elements in the first chalcogenide glass is determined empirically according to the specifics of the photonic crystal fiber. For example, where the fiber design requires the first chalcogenide glass to have specific refractive index, an amount of an index-raising element sufficient to provide the desired index is added. Preferably, the amount of any index-raising element included will be sufficiently small to not substantially affect the stability of the glass (e.g., to prevent phase separation of the glass components). In some embodiments, the amount of $As_2Se_3$ in the first chalcogenide glass can be more than about 80% molar (e.g., more than about 90%, 95%, 99%) and the amount of one or more additional elements can be less than about 20% molar (e.g., less than about 10%, 5%, 1%).

The amount of the second chalcogenide glass in the low index material can vary. Typically, the low index material includes at least about 50% by weight of the second chalcogenide glass (e.g., at least 70%, 80%, 90%, 95%, 98%, 99%). The low index material can be substantially exclusively chalcogenide glass (i.e., about 100% chalcogenide glass). In some embodiments, in addition to the second chalcogenide glasses, the high index material can include one or more additional chalcogenide glasses, heavy metal oxide glasses, amorphous alloys, or combinations thereof.

In some embodiments, the low index material is a chalcogenide glass including As and Se. For example, the high index material can include $As_2Se_3$.

The second chalcogenide glass can include $As_2Se_3$ and one or more other elements. Examples of other elements that can be included are B, F, Al, Si, P, S, and/or Ge. In these embodiments, the index of the second chalcogenide glass can be less than the refractive index of $As_2Se_3$. For example, chalcogenide glasses including P and/or S in addition to $As_2Se_3$ can reduce the refractive index of the chalcogenide glass below the refractive index of $As_2Se_3$. The refractive index of the second chalcogenide glass in these embodiments can be less than about 2.7 (e.g., less than 2.5, such as about 2.0 or less).

Some elements that can be added to $As_2Se_3$ to reduce the refractive index of the second chalcogenide glass can change the thermomechanical properties of the first chalcogenide glass from the thermomechanical properties of $As_2Se_3$. For example, Si may reduce the refractive index of the second chalcogenide glass, and can increase $T_g$. In some such cases, one or more additional compounds may be added to the second chalcogenide glass to mitigate the effects of the index-reducing element to ensure the low index material is compatible with the high index material. In embodiments, the second chalcogenide glass can have a $T_g$ of more than about 180° C. (e.g., about 200° C., 220° C., 250° C. or more).

The amount of additional compounds added to $As_2Se_3$ in the second chalcogenide glass can vary. Typically, the amount of various elements in the second chalcogenide glass is determined empirically according to the specifics of the photonic crystal fiber. For example, where the fiber design requires the second chalcogenide glass to have specific refractive index, an amount of an index-reducing element sufficient to provide the desired index is added. Preferably, the amount of any index-reducing elements included will be sufficiently small to not substantially affect the stability of the glass (e.g., to prevent phase separation of the glass components). In some embodiments, the amount of $As_2Se_3$ in the second chalcogenide glass can be more than about 80% molar (e.g., more than about 90%, 95%, 99%) and the amount of one or more additional elements can be less than about 20% molar (e.g., less than about 10%, 5%, 1%).

In some embodiments, the second chalcogenide glass can include $As_2S_3$, GePS, and/or AsPS. The composition of the second chalcogenide glass including $As_2S_3$, GePS, and/or AsPS can be manipulated to obtain a desired refractive index and/or thermomechanical properties as described for $As_2Se_3$ above.

The first and/or second chalcogenide glasses can have relatively low loss at a wavelength of interest compared to some non-chalcogenide glasses and/or some polymers (e.g., PES). For example, at 10.6 microns, the first and/or second chalcogenide glasses can have a loss co-efficient of less than about 1,000 dB/m. More preferably, the first and/or second chalcogenide glasses can have a loss coefficient of less than about 50 dB/m, such as less than about 20 dB/m, 10 dB/m or less. In contrast, polymers such as PES can have a loss co-efficient of 10,000 dB/m or more.

In order for dielectric waveguides to function reliably at high power densities, they should have low defect densities. In photonic crystal fibers, such as those described herein, defects include delamination between layers, cracking, or other structural defects, and material defects, such as impurities. Selecting materials with matched thermomechanical properties can reduce the occurrence of defects. One way to form preforms of these materials with high purity is to use CVD.

In embodiments where CVD is used, the high and low index materials (e.g., the first and second chalcogenide glasses) should be compatible with this process. To be compatible with CVD, precursors for the compounds from which solid deposits can be formed should be available for forming the high and low index materials.

Figure 4:
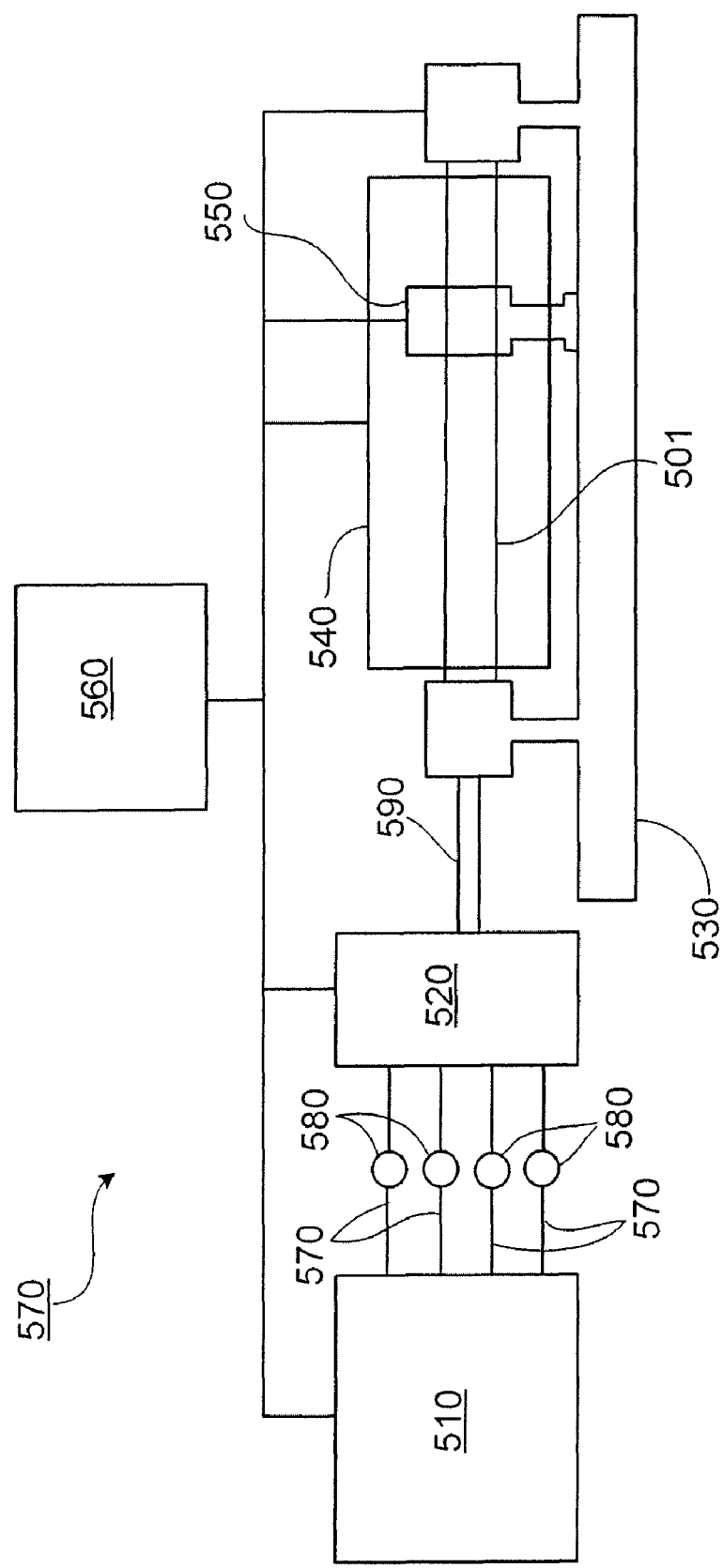
FIG. 4 is a schematic diagram of a chemical vapor deposition (CVD) system.

Referring to FIG. 4, during the CVD process, a CVD system 500 is used to deposit layers of different materials on the inner surface of a deposition tube 501. CVD system 500 includes a gas source 510, a gas manifold 520, and a lathe 530 on which deposition tube 501 is mounted. The material the system deposits in tube 501 forms in a chemical reaction between gases supplied to tube 501 by gas source 510 via manifold 520. System 500 also includes a microwave source 550, which excites a plasma in the gas within the tube, causing the gases to react and deposit material on the tube surface. A furnace 540 heats tube 501 to a desired temperature during the deposition process. System 500 also includes tubes 570 that transport gases from gas source 510 to manifold 520. Valves 580 modulate the flow of gases from gas source 510 to manifold 520. The gases mix inside manifold 520 before being transported to deposition tube 501 via a pipe 590. The deposition process is controlled by an electronic controller 560 (e.g., a system including a processor for executing instructions, such as a computer).

Figure 5:
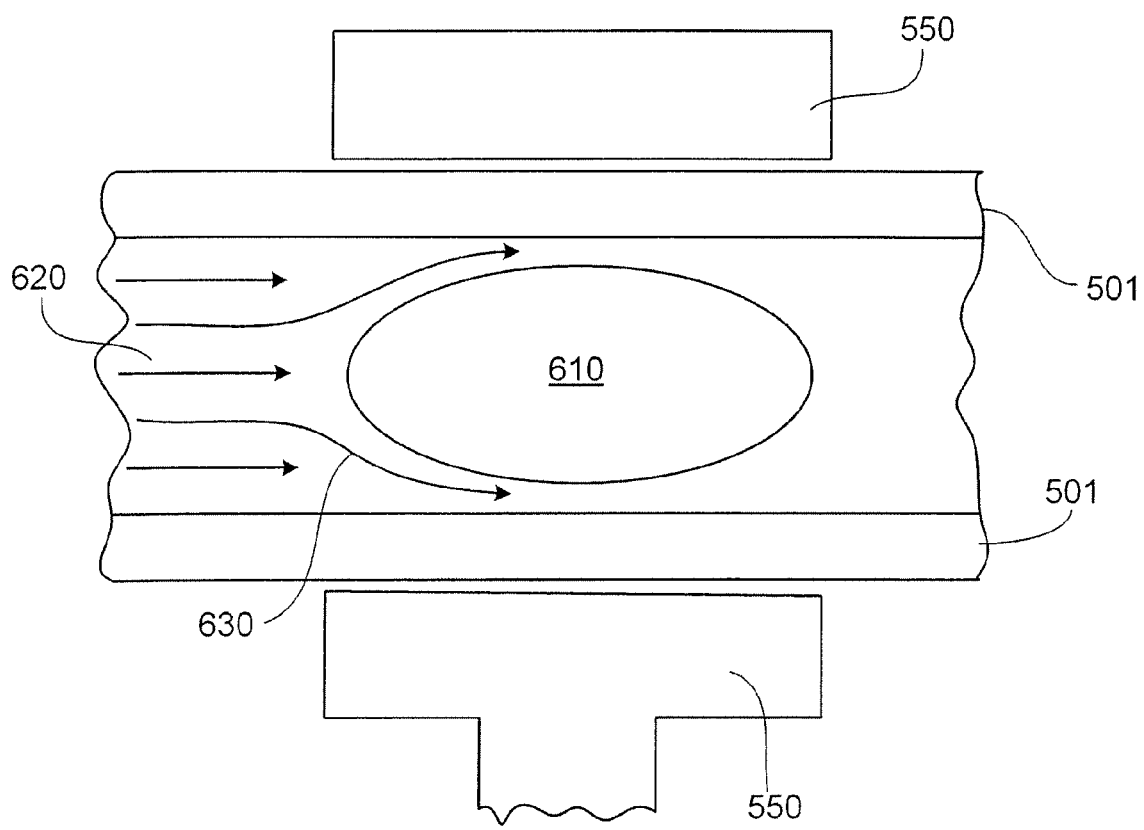
FIG. 5 is a schematic diagram of a portion of the CVD system shown in FIG. 4.

Referring also to FIG. 5, microwave source 550 includes a resonator enclosing a segment of deposition tube 501. During operation, the resonator couples microwave energy from a waveguide into gas (e.g., vapor) within tube 501. Typically, this energy has a frequency in the range of about 1 to about 40 GHz. For example, the energy can have a frequency of about 5 to 15 GHz, such as about 12.5 GHz. The energy generates a local non-isothermal low-pressure plasma region 610 within the tube. Gas flowing through the deposition tube is deflected by plasma region 610 to the space between plasma region 610 and tube 501, as indicated by arrows 620 and 630. Gasses proximate to the plasma react with each other, forming a layer of material one the inner surface of tube 501 adjacent plasma 610. Preferably, microwave energy is transferred without substantial energy loss to the tube itself, and microwave energy is coupled directly into the activated plasma inside the tube.

During operation, system 500 translates microwave source 550 back and forth along the axis of tube 501, exciting plasma in the portion of the tube adjacent the source. Each pass of microwave source 500 relative to the tube results in a layer of material being deposited within the tube. The microwave source 550 can be translated as many times as necessary to provide the desired thickness of material with in the tube.

Furnace 540 heats the tube surface to a temperature sufficient to ensure that deposited materials diffuse to form a consolidated layer. For this reason, the temperature depends upon the type of material being deposited. For many materials, the tube is heated to a temperature between about 80° C. and 250° C., such as about 100° C. The tube temperature is kept below a temperature that would cause any substantial adverse reaction in the deposited layer. For example, chalcogenide glasses may oxidize at temperatures above 250° C.-300° C. Thus, for these glasses, the tube surface is maintained below these temperatures. Lower process temperatures can also reduce mechanical stress in the deposited layers, reducing the possibility of fracture and/or delamination in the multilayer structure. The tube surface temperature may be varied between depositing layers of different materials therein.

Controller 560 controls numerous parameters associated with the deposition process to provide a layer of material having the desired thickness and material properties (e.g., composition, density, homogeneity and/or layer morphology). These parameters include surface temperature, gas pressure, gas composition, microwave energy, and microwave frequency. The effects of the parameters on deposition rate and material properties are typically interrelated. For example, changes in gas pressure and/or gas composition can affect the deposition rate by providing more or less of one or more reactant gases to the tube. Variations in microwave energy and/or frequency can vary the deposition rate by changing the temperature of the tube surface.

Due to its shape, plasma region 610 is often referred to as a plasma "ball." The shape and size of the plasma ball is related to the plasma mode excited by the radiation and can be affected by gas pressure, the shape of the cavity, the gas composition, and/or the ionization potential of the gas. For example, under otherwise equivalent conditions, the size of a plasma ball formed in nitrogen is typically smaller than a plasma ball formed in argon. Because the gas phase reaction of component gases occurs proximate to the plasma ball, the shape and size of the plasma ball can be selected to control the tube area over which deposition occurs. In many embodiments, where the deposition tube is cylindrical, the $T_{01}$ plasma mode is desirable.

Initially, a first gas composition is used to produce a layer of a first material. After depositing the first material but prior to depositing the second material the tube is purged of residual reactive gases. Typically, the system flows an inert gas (i.e., inert with respect to the layer of material just deposited in the tube and with residual gases in the tube) through the tube for a time sufficient to purge substantially all of the first gas composition from the tube. Examples of inert gases include nitrogen and noble gases, such as argon. The system can monitor the composition of gas purged from the tube to establish when the concentration of the first gas composition in the tube is sufficiently small to be negligible.

The first and second gas compositions include component gases that react upon heating by the plasma to form the first and second materials, respectively. The type and relative concentration of component gases are selected based on the desired composition of the materials. In embodiments where either of the materials are a chalcogenide glass, at least one of the respective component gases includes a chalcogen element. In embodiments where either of the materials is an oxide glass, the respective gas composition includes oxygen (e.g., as oxygen gas or the gas of an oxygen containing compound). In each gas composition, one or more of the components can be a halide (e.g., a chloride) gas or a hydride gas. Examples of chlorides include $SiCl_4$, $BCl_3$, $POCl_3$, $PCl_3$, $GeCl_4$, $SeCl_2$, $AsCl_3$, and $S_2Cl_2$. Examples of hydrides include $H_2Se$, $GeH_4$, $H_2S$, $H_2Te$, $AsH_3$, and $PH_3$. In some embodiments, chlorides may be preferred over hydrides, especially where hydrogen and/or oxygen can contaminate the deposited material. Such contamination may occur where decomposition of the component gas is incomplete and/or due to the presence of water and/or oxygen.

During the deposition of a layer of the first or second material, the relative concentration of component gases can remain the same or vary. Where a homogeneous layer is desired, the relative concentration of component gases is substantially constant. However, where variations in composition are desired through the layer, the relative concentration of component gases can vary during deposition of the layer. For example, where a refractive index gradient through the layer is desired, the relative concentration of component gases can be varied during deposition of the layer.

The first and/or second gas compositions can also include a carrier gas, which is inert with respect to the other component gases. A carrier gas can be used to adjust the pressure of the first gas composition without affecting the relative concentration of the component gases. Carrier gases are selected based on the composition of the component gases. Examples of carrier gases include nitrogen and noble gases, such as argon, and mixtures thereof.

The ratio of carrier gas to component (reactant) gas(es) in a gas composition may vary as desired. Typically, the ratio of carrier to component gas(es) is between about $1:10^{-4}$ and $1:10^{-1}$. The relative amount of component gas(es) to carrier gas can affect the deposition rate and the morphology of the deposited material.

In some embodiments, the first deposited layer may adversely react with a compound or element forming the subsequent layer while that element or compound is in the form of a gas. An adverse reaction introduces impurities into the preform, which can be detrimental to fiber performance. For example, where an oxide glass is being deposited onto a layer of a chalcogenide glass, gaseous oxygen can oxidize the chalcogenide glass. In such instances, an inert component gas containing the reactive element or compound can be chosen for the gas composition to reduce (e.g., mitigate) any adverse reaction between the gas and the previously deposited layer (or tube). An example of a gas that can be used to provide oxygen when depositing an oxide glass on a chalcogenide (or other oxidizable glass) is nitrous oxide. In some embodiments, the relative concentration of the reactive gas (e.g., oxygen) can be increased once a thin layer of material (e.g., oxide glass) has been deposited on the previous layer.

Material may be deposited at relatively high rates. For example, the deposition rate may be about 1 μm/min or more (e.g., more than about 5 μm/min, 8 μm/min, 10 μm/min).

In general, tube 501 can be formed from any material. Where the tube forms part of the final drawn fiber, the tube should be formed from a material that can be co-drawn with material deposited within the tube. In some embodiments, tube 501 is formed from a glass or a polymer. Examples of suitable glasses include silica-based glasses. Examples of suitable polymers include polysulfones, fluoropolymers (e.g., Teflon®), polyethylene and their derivatives.

Although microwave radiation is used to excite plasma in system 100, other forms of EM radiation can also be used. For example, radio frequency radiation (e.g., with frequencies less than about $10^9$ Hz) can be used to excite plasma in the tube. Furthermore, in some embodiments, plasma can be excited thermally alternatively or additionally to using EM radiation.

To make a preform for a photonic crystal fiber, additional layers of material can be deposited on the layer of the second material. In some embodiments, the sequential deposition of layers of the first and second materials is repeated multiple times (e.g., twice, three time, four times, or more). Alternatively, the composition of, e.g., a third layer may differ from the composition of the first layer. For example, to make a preform for a low loss photonic crystal fiber, materials with high index contrast (e.g., layers of a chalcogenide glass and an oxide glass) can be deposited initially, followed by layers of materials with low absorption (e.g., two different chalcogenide glasses). In some embodiments, many layers can be deposited (e.g., more than about 10 layers, such as 20 or more layers).

The thickness of each layer may vary as desired. Generally, the deposited layer thickness will depend on the desired structure of the waveguide and draw ratio to be used in subsequent fiber drawing. The thickness of alternating layers may be the same or different. In some embodiments, layers are formed that have the same optical thickness. Deposited layer thickness is typically between about 0.1 nm and 500 μm.

Although the CVD methods described herein are with reference to photonic crystal fibers, they can also be used to make other types of waveguides (e.g., TIR optical fibers).

Figure 6:
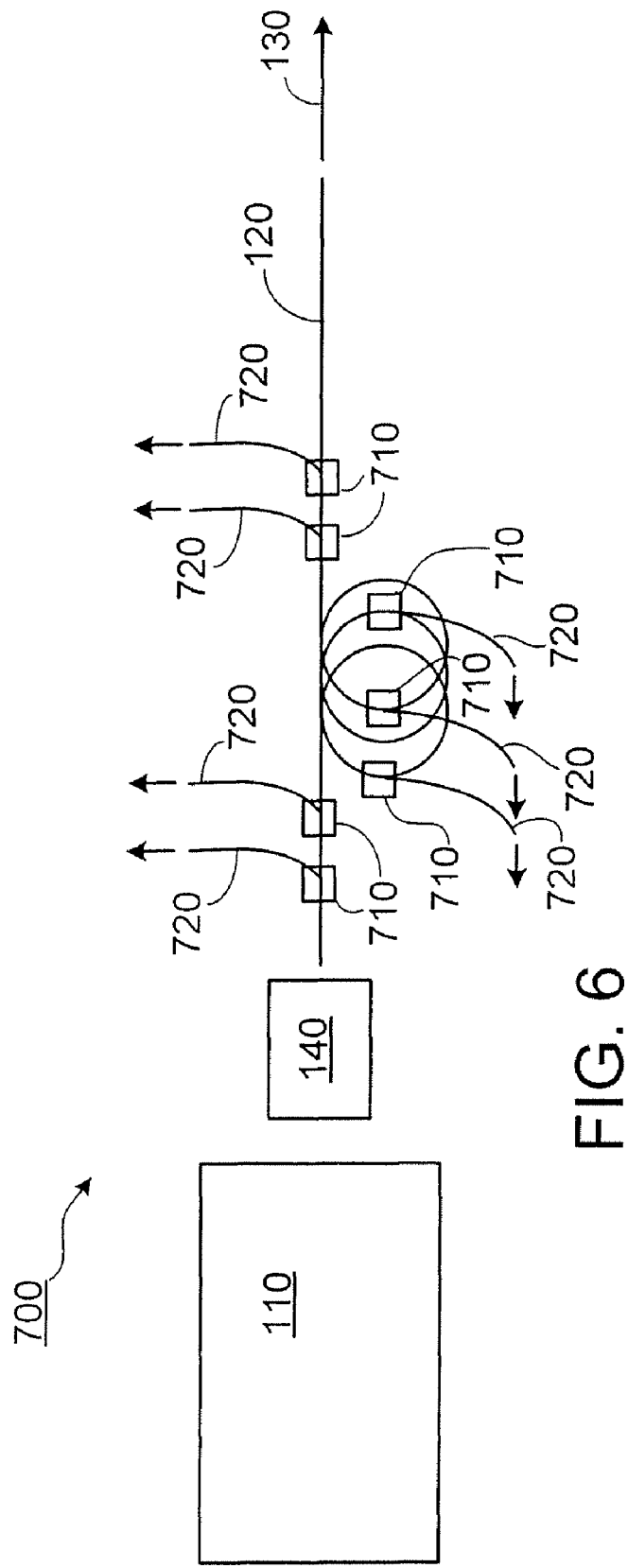
FIG. 6 is a schematic diagram of a laser system incorporating a photonic crystal fiber.

Referring to FIG. 6, in some embodiments, system 100 may be modified to simultaneously provide output energy from laser 110 at multiple locations. Modified system 700 includes a number of couplers 710, which couple energy guided in waveguide 120 into other waveguides 720. Each waveguide 720 can deliver laser energy to a different location remote from laser 110. Waveguides 720 can be the same or different as waveguide 120. For example, waveguides 720 can be photonic crystal fibers or some other type of waveguide (e.g., TIR fiber). The intensity of laser energy coupled into each waveguide 720 can be the same or different. Where each waveguide's output is used in similar applications, the intensity delivered by each waveguide can be the same. However, where applications are different, the delivered intensity can vary accordingly.

It will be understood that various modifications to the foregoing embodiments may be made without departing from the spirit and scope of the invention. Accordingly, other embodiments are within the scope of the following claims.

What is claimed is:

1. A method, comprising:
   forming a layer of a chalcogenide glass on an inner surface of a hollow tube, the chalcogenide glass layer extending along a length of the hollow tube;
   activating a plasma within a region of the hollow tube, the region extending along the hollow tube a distance shorter than the length of the hollow tube;
   introducing a gas composition into the hollow tube, wherein components of the gas composition interact with the plasma to form an oxide glass; and
   moving the plasma region relative to the hollow tube to form a layer of the oxide glass on the chalcogenide glass layer along the length of the hollow tube,
   wherein the gas composition is substantially inert with respect to the chalcogenide glass in the absence of the plasma, the gas composition comprises nitrous oxide that interacts with the plasma to provide oxygen from which the oxide glass is formed.

2. The method of claim 1, wherein the first gas composition further comprises a carrier gas and a halide compound.

3. The method of claim 1, wherein the interaction between the gas composition, the plasma, and the chalcogenide glass does not substantially change physical properties of the chalcogenide glass layer.

4. The method of claim 1, wherein the layer of the chalcogenide glass is formed using plasma-enhanced chemical vapor deposition.

5. The method of claim 1, further comprising forming another layer of the chalcogenide glass or a layer of a different chalcogenide glass on the layer of the oxide glass.

6. The method of claim 1, further comprising forming multiple additional alternating layers of chalcogenide glass and oxide glass.

7. The method of claim 1, wherein activating a plasma within the region of the hollow tube comprises exposing gas in the hollow tube to electromagnetic radiation.

8. The method of claim 7, wherein the electromagnetic radiation comprises microwave radiation or radio frequency radiation.

9. The method of claim 1, wherein introducing the gas composition comprises heating the surface to a temperature between about 80° C. and 250° C.

10. The method of claim 1, wherein the chalcogenide glass and oxide glass layers are layers of a preform and the method further comprises drawing the preform to form a photonic crystal fiber.

11. The method of claim 10, wherein the photonic crystal fiber comprises a core and a confinement region surrounding core, where the chalcogenide glass layer and oxide glass layer correspond to layers in the confinement region.

12. The method of claim 11, wherein the confinement region includes one or more polymer layers.

13. The method of claim 12, wherein the layers in confinement region corresponding to the chalcogenide glass layer and the oxide glass layer are closer to the core than the one or more polymer layers.

14. The method of claim 1, wherein the hollow tube comprises a polysulfone, a fluoropolymer, polyethylene or a derivative of a polysulfone, a fluoropolymer, or polyethylene.

* * * * *